Jan. 2, 1962 W. S. LATHAM ET AL 3,015,810

MAGNETIC RECORDER AND REPRODUCER

Filed Dec. 27, 1954 3 Sheets-Sheet 1

INVENTORS.
WILLIAM S. LATHAM
WILLIAM F. SAARS
BY George Sipkin
Leo J. Huntzberger
ATTORNEYS Jan. 2, 1962 W. S. LATHAM ET AL 3,015,810

MAGNETIC RECORDER AND REPRODUCER

Filed Dec. 27, 1954 3 Sheets-Sheet 2

INVENTORS.
WILLIAM S. LATHAM
WILLIAM F. SAARS
BY George Sipkin
Lee J. Huntzberger
ATTORNEYS Jan. 2, 1962 W. S. LATHAM ET AL 3,015,810

MAGNETIC RECORDER AND REPRODUCER

Filed Dec. 27, 1954 3 Sheets-Sheet 3

INVENTORS.
WILLIAM S. LATHAM
WILLIAM F. SAARS
BY George Lipkin
Leo P. Huntzberger
ATTORNEYS United States Patent Office 3,015,810

Patented Jan. 2, 1962

3,015,810
MAGNETIC RECORDER AND REPRODUCER

William S. Latham, Groton, and William F. Saars, Niantic, Conn., assignors to the United States of America as represented by the Secretary of the Navy Filed Dec. 27, 1954, Ser. No. 477,958
10 Claims. (Cl. 340—174.1)
(Granted under Title 35, U.S. Code (1952) sec. 266)

The invention described herein may be manufactured and used by or for the Government of the United States of America for governmental purposes without the payment of any royalties thereon or therefor.

This invention concerns magnetic recording and reproduction.

In prior art devices it is necessary to reproduce stored energy at the rate of recording; otherwise, a change in the speed of the magnetic recording medium for reproduction would interrupt the continuity of the recording process.

Although the utility of this invention lies in the fact that the rate of reproduction is higher than that of recording, it is also possible to reproduce the energy at lower rates. In addition, this device is capable of continually reproducing at any relative rate, finite sequences of recorded energy in an order opposite to that in which it was recorded.

The recording, erasing, and playback heads are conventional, as are the other components of the recorder, although the closed cylindrical formed magnetic recording medium is mounted in such a way that it may be turned at any desired speed in either direction.

Energy or intelligence which is recorded on the closed cylindrical form of magnetic recording medium is reproduced by a playback head scanning the inner surface of the medium while the recording of intelligence takes place on the outer surface of said medium. The magnetic recording medium cylinder is driven by a motor, as is the arm on which the playback head is supported. A slip ring through which the output intelligence is fed to a utilizing circuit is positioned coaxially with the same shaft, through which the motor drives the playback head supporting arm. The rate of speed of the playback head is independent of that of the recording medium.

The recording head is positioned adjacent to the outer surface of the recording medium in cooperative relation with an erasing head which is utilized to erase any intelligence stored during the previous rotation of the medium or any remanent flux if no signal or intelligence is stored on the medium.

The principal object of this invention is to reproduce magnetically recorded intelligence at any desired rate different from (faster or slower than) that at which the intelligence is recorded.

Another object of this invention is the magnetic recording of intelligence on a suitable medium in the form of a closed cylinder.

A further object of the invention is the magnetic recording of intelligence on one side of a suitable recording medium and the reproduction of the same intelligence from the other side of the medium; that is, the printing of energy "through" the medium.

This invention may be used to perform many circuit functions, among which are instantaneous frequency multiplication, frequency division and continuously operating phase delay.

Other objects and many of the attendant advantages of this invention will be readily appreciated as the same becomes better understood by reference to the following detailed description when considered in connection with the accompanying drawings wherein.

Figure 1:
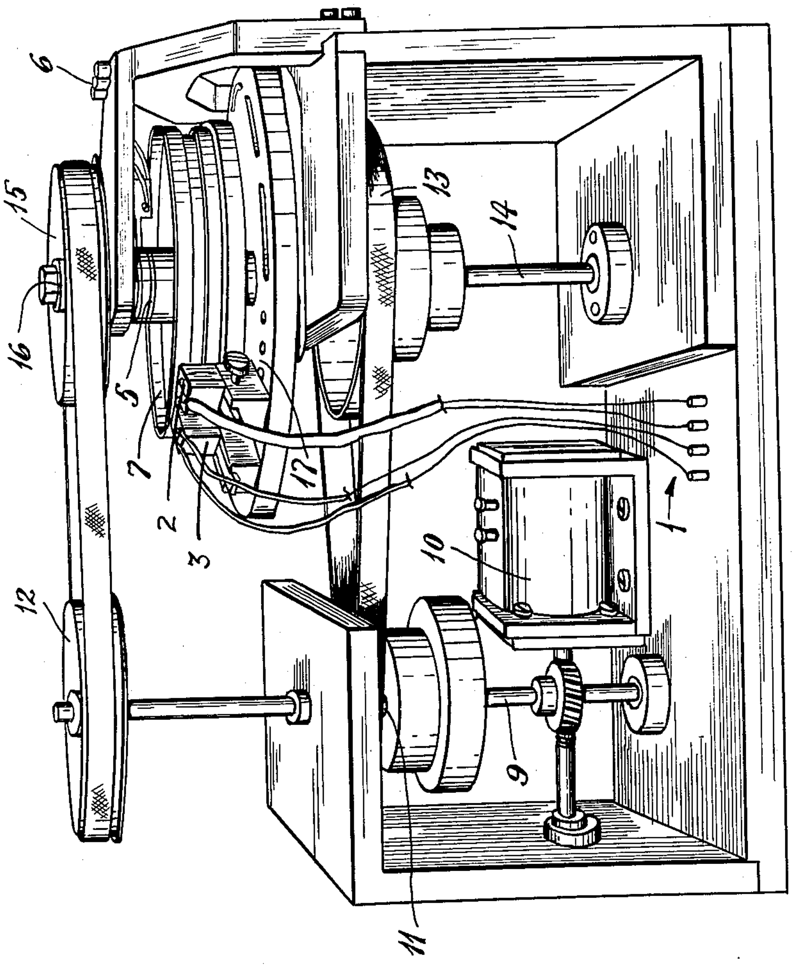
FIG. 1 is one embodiment of the present invention.

FIG. 1 is one embodiment of the present invention. The motor 10 drives a shaft 9 which drives a pulley 11 and a second pulley 12. The pulley 13 is driven by the pulley 11 via a belt. The pulley 13 is on a shaft 14 upon which is affixed a magnetic recording medium 7. The second pulley 12 on the shaft 9 is belt-connected to a pulley 15 which is on a shaft 16 to which the arm 8 is affixed. The playback head 4, which is supported by the arm 8, rotates about the shaft 16. The slip rings 5 are connected to the shaft 16; the output leads being taken from the slip rings 5 to the point 6 where the output is utilized. The recording head 2 and the erasing head 3 are supported on the platform 17 which permits them to be positioned adjacent to the recording medium 7. The input intelligence is fed to the recording head 2 from the input point 1.

Figure 2:
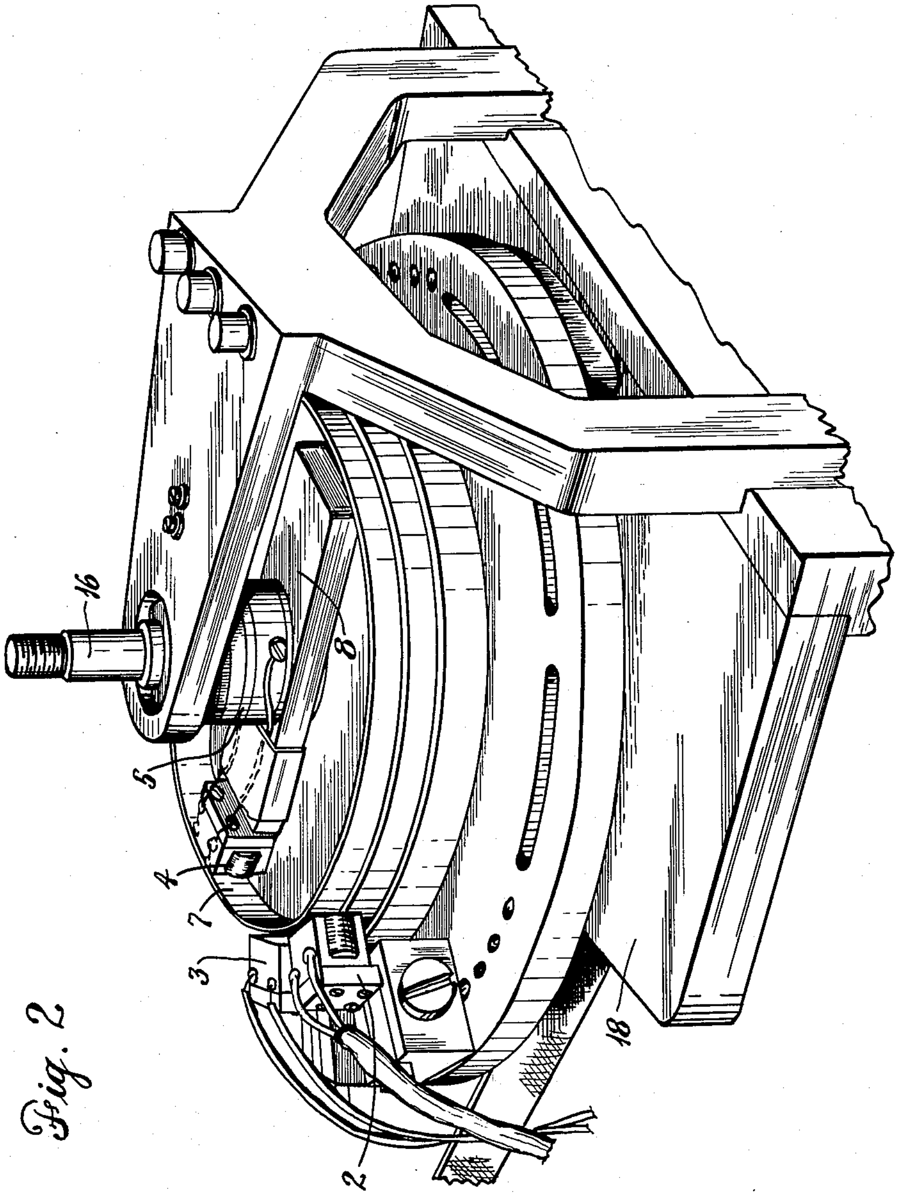
FIG. 2 is the magnetic recording and reproducing portion of the embodiment shown in FIG. 1.

FIG. 2 is the magnetic recording and reproducing portion of the present invention. The shaft 16 which supports the arm 8 and the slip rings 5 is indicated as being supported by a shelf 18. The playback head 4, which is supported by the arm 8, is indicated as being in operative relation to the magnetic recording medium 7. The recording head 2 and the erasing head 3 are indicated as being positioned on the platform 17 so that they may be placed in operative relation to the magnetic recording medium.

Figure 3:
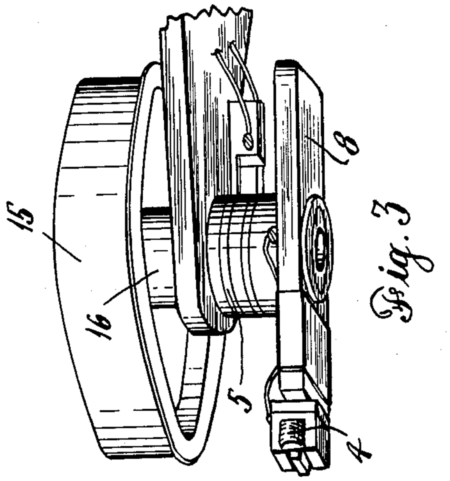
FIG. 3 is the reproducing portion of the embodiment shown in FIG. 1.

FIG. 3 is the reproducing portion of the present invention. The pulley 15 which drives the shaft 16 is shown, as are the arm 8 which supports the playback head 4, and the slip rings 5.

Figure 4:
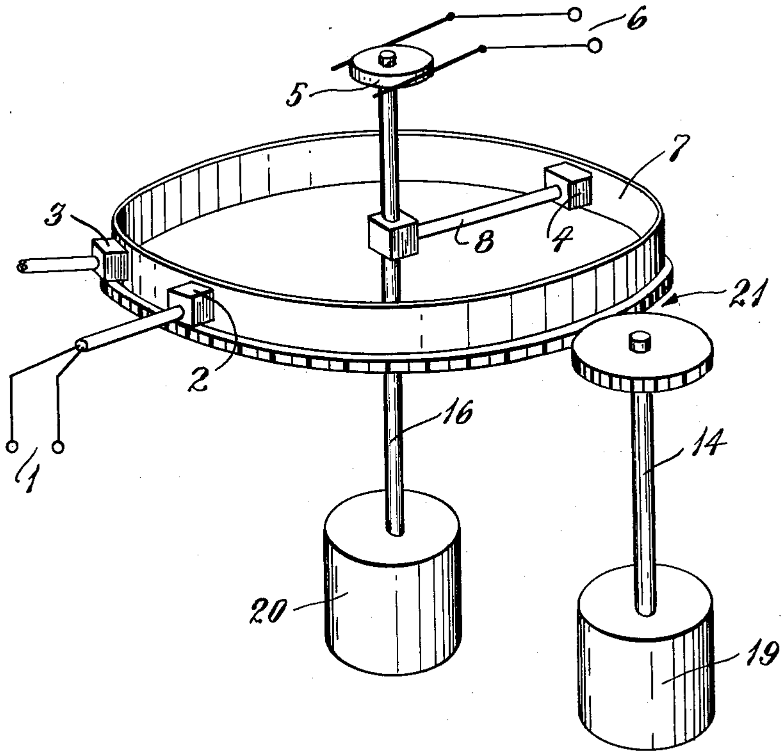
FIG. 4 is a preferred embodiment of the present invention.

The preferred embodiment of the invention is shown in FIG. 4 and operates as follows:

Intelligence in electrical form is brought from the source of input 1 to the recording head 2 by means of electrical leads. In the conventional manner recording head 2 stores this energy on the outer surface of the magnetic recording medium 7. The erasing head 3, preceding the recording head 2, removes the intelligence stored during the previous rotation of the magnetic recording medium 7, or the remanent flux if no prior intelligence is stored on the medium. The rotating playback head 4 takes the intelligence energy from the other (inner) surface of the magnetic recording medium 7. Leads and the slip ring take-off 5 carry this energy from the rotating playback head 4 to circuits in which it is ultimately used or permanently stored.

The motor 20 drives the playback head supporting arm 8 at any desired speed and in any desired direction through the shaft 16. The motor 19 drives the magnetic recording medium 7 at any desired speed and in any desired direction through the shaft 14 and the gearing arrangement 21.

There are many embodiments and variations of my basic invention, only one such variation being indicated in the figures. For instance, the recording head may be placed inside the magnetic recording medium, and the playback head may be placed outside said medium. Also, the recording head may be placed on a rotating arm while the playback head is kept stationary. Furthermore, both the recording and the playback heads may be rotated while the magnetic recording medium is maintained stationary.

Obviously many modifications and variations of the present invention are possible in the light of the above teachings. It is therefore to be understood that within the scope of the appended claims the invention may be practiced otherwise than as specifically described.

We claim:

1. A device for magnetic recording and reproducing comprising: a support; a thin magnetic recording medium of closed circular configuration; first means engaging said support and said medium for supporting said medium of said support; a recording head; second means engaging said support and said recording head for supporting said recording head on said support contiguous with one surface of said medium, at least one of said first and second means being rotatable relative to said support about the axis of said medium whereby said recording head describes a closed circular course on said medium; a playback head; third means engaging said support and said playback head for supporting said playback head on said support contiguous with the opposite surface of said medium and substantially in registration with the course described by said recording head on the one side of said medium, at least one of said second and third means being rotatable relative to said support about the axis of said medium whereby said playback head describes a closed circular course on said medium substantially in registration with the course described by said recording head on said medium; an erase head fixedly mounted adjacent one of said record head and playback head, and contiguous with the corresponding surface of said medium; and drive means coupled to the rotatable means to produce any combination of relative angular velocities between said record head and said medium, and said playback head and said medium, relative to the axis of said medium.

2. A device as described in claim 1 wherein said first means is rotatable.

3. A device as described in claim 2 wherein said third means is rotatable.

4. A device as described in claim 3 wherein said erase head is fixedly mounted adjacent said recording head.

5. Means for recording a phenomenon at a relatively slow rate and simultaneously repetitively reproducing it at a rate adequate for maintaining persistence of vision comprising an endless record medium, means for driving said recording medium in a closed circuit, a recording head magnetically engaging said record medium, means for recording signals on said record medium at a predetermined rate with said recording head, means for erasing said recorded signal substantially at the end of said recording circuit and a separate reproducing head arranged to repeatedly scan said record medium including the portion on which recording is taking place at a second rate greater than twice said predetermined rate and at a repetitive rate high enough to reproduce the record with persistence of vision.

6. Means for recording a phenomenon at a relatively slow rate and simultaneously repetitively reproducing it at a rate adequate for maintaining persistence of vision comprising an endless record medium, means for driving said recording medium in a closed circuit, a recording head magnetically engaging said record medium, means for recording signals on said record medium at a predetermined rate with said recording head, means for erasing said recorded signal substantially at the end of said recording circuit, and a separate reproducing head arranged to repeatedly scan said record medium including the portion on which recording is taking place at a second rate greater than twice said predetermined rate and at a repetitive rate high enough to reproduce the record with persistence of vision, said separate reproducing head being arranged to traverse said record medium along a path adjacent to the path of the recording medium and slightly spaced therefrom so that the reproducing head may pass the recording head without mechanical interference between them.

7. A transient recorder comprising an endless erasable recording medium, recording and erasing heads arranged to cyclically traverse a path to produce a record track on said medium while continuously recording at the beginning of a cycle and continuously erasing near the end of the cycle, a reproducing head arranged to cyclically traverse an adjacent mechanically-independent path closely paralleling the path of said recording head at the recording location and within the influence of said record track and said track recording head at a cyclical rate substantially greater than twice the recording rate, whereby each reproduction cycle repeats a majority of the signal reproduced in the preceding reproduction cycle even though recording is continued simultaneously with reproduction.

8. Means for recording a relatively slowly-changing phenomenon and reproducing it repetitively at a much faster rate comprising an endless magnetic record medium, a recording head actuated by the phenomenon and magnetically engaging the record medium, means to impart a continuous relative motion between said medium and said head so that an endlessly recorded reentrant track is produced on said medium at a predetermined recording speed, means magnetically engaging said medium to erase the recorded track continuously at a point where its circuit back to the recording head is substantially completed, a separate reproducing head magnetically engaging the medium and arranged to repeatedly scan said track including its last-recorded portion and the field of the recording head continuously at a speed greater than twice the recording speed, whereby a phenomenon including its most recent portion occurring during the circuit of the track may be viewed oscilloscopically.

9. Means for recording a relatively slowly-changing phenomenon and reproducing it repetitively at a much faster rate comprising a magnetic record medium, a recording head actuated by the phenomenon and magnetically engaging the record medium, means to impart a continuous relative motion between said medium and said recording head so that a record track is produced on said medium at a predetermined recording speed, a separate reproducing head magnetically engaging the record medium and adapted to pass the recording head to reproduce the most recently recorded part of the record track, and means to impart a relative motion between said reproducing head and said record medium greater than twice the recording speed and to scan said record at a repetitive rate adequate to sustain persistence of vision whereby the phenomenon including its most recent part may be viewed oscilloscopically with persistence of vision.

10. A transient recorder comprising an endless erasable recording medium, recording and erasing heads arranged to cyclically traverse a path to produce a record track on said medium while continuously recording at the beginning of a cycle and continuously erasing near the end of the cycle, a reproducing head arranged to cyclically traverse an adjacent mechanically-independent path closely paralleling the path of said recording head at the recording location and within the influence of said record track and said track recording head at a cyclical rate substantially greater than twice the recording rate, whereby each reproduction cycle repeats a majority of the signal reproduced in the preceding reproduction cycle even though recording is continued simultaneously with reproduction, and utilization means operated from said reproducing head.

References Cited in the file of this patent

UNITED STATES PATENTS

| | | |
|---|---|---|
| 882,329 | Lieb | Mar. 17, 1908 |
| 2,105,016 | Smith | Jan. 11, 1938 |
| 2,229,293 | Huntley | Jan. 21, 1941 |
| 2,462,435 | Stanton | Feb. 22, 1949 |
| 2,737,646 | Muffly | Mar. 6, 1956 |